July 17, 1951  R. REDER  2,560,742
WING CONSTRUCTION FOR MODEL AIRPLANES
Filed Jan. 29, 1949  3 Sheets-Sheet 1

Inventor:
Robert Reder,
By Schroeder, Merriam,
Hofgren & Brady, Attys

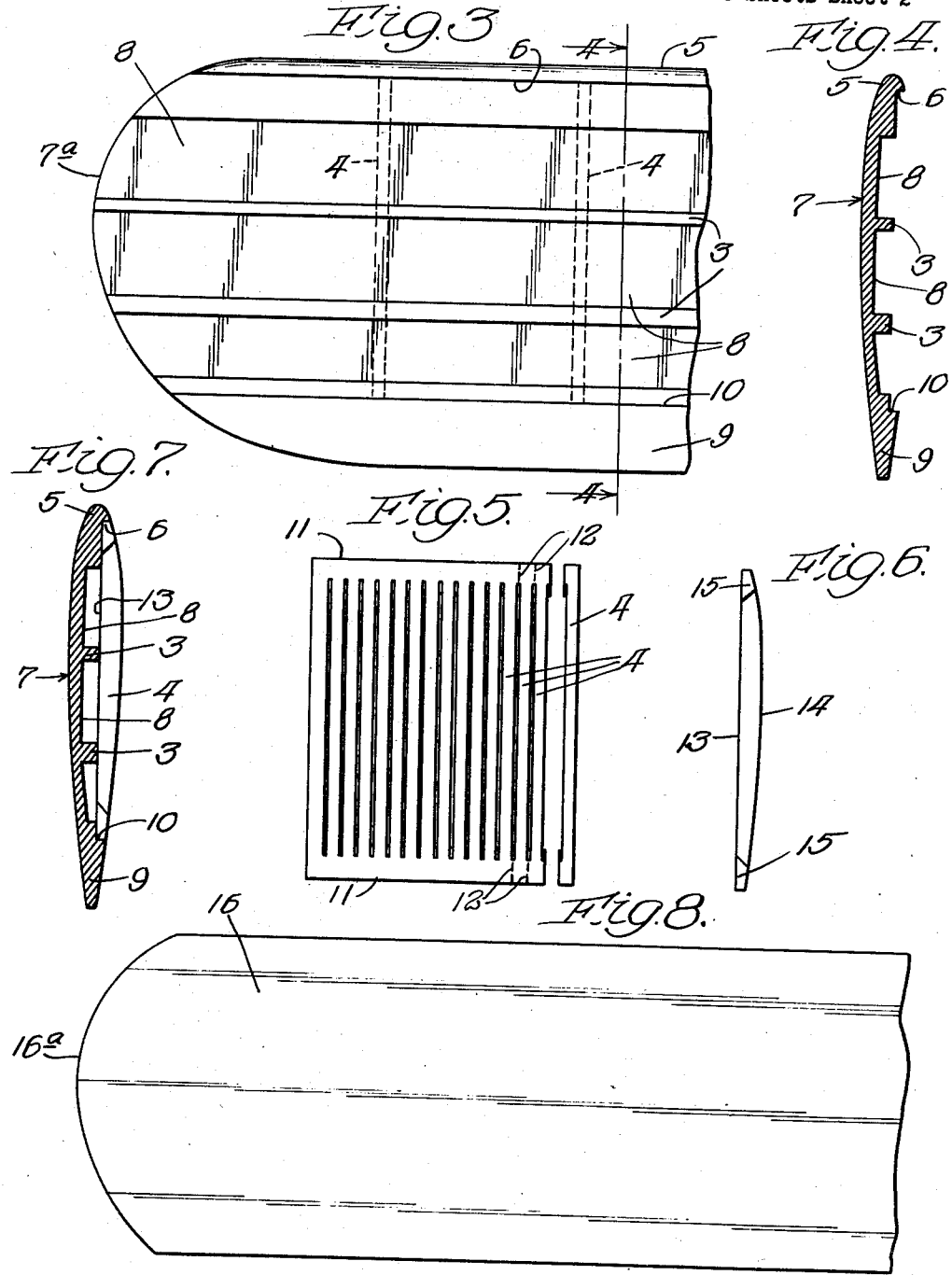

July 17, 1951 R. REDER 2,560,742
WING CONSTRUCTION FOR MODEL AIRPLANES
Filed Jan. 29, 1949 3 Sheets-Sheet 3
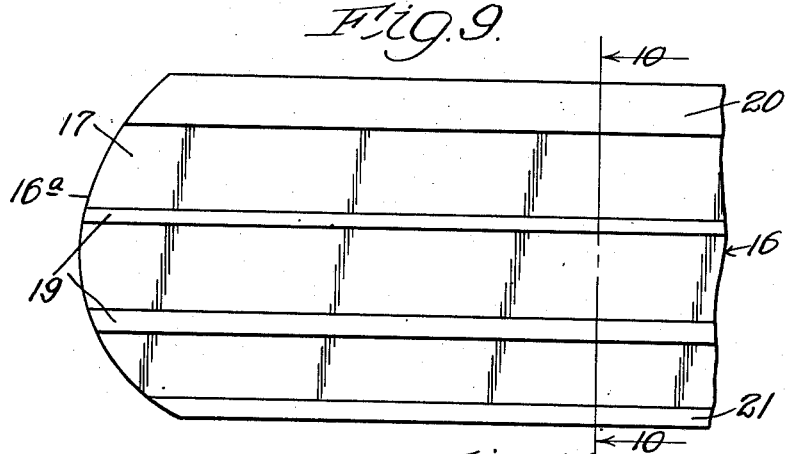
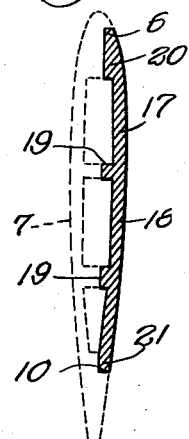
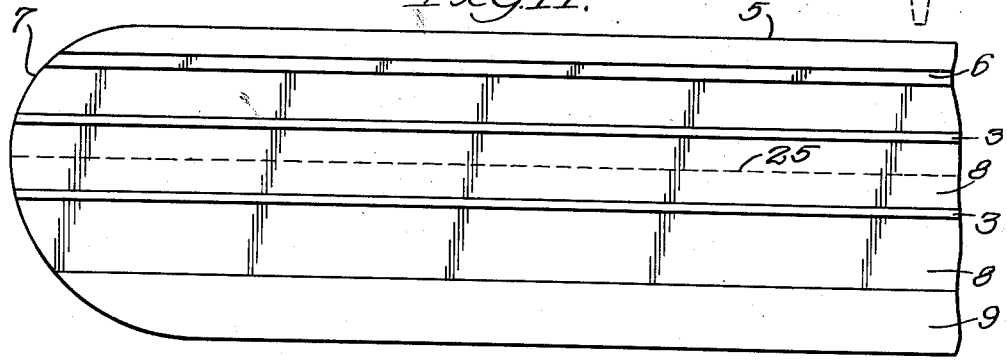
Inventor:
Robert Reder,
By Schroeder, Merriam,
Hofgren & Brady, Attys.

Patented July 17, 1951

2,560,742

UNITED STATES PATENT OFFICE 2,560,742

WING CONSTRUCTION FOR MODEL AIRPLANES

Robert Reder, Chicago, Ill., assignor to Monogram Models, Inc., Chicago, Ill., a corporation of Illinois Application January 29, 1949, Serial No. 73,538

3 Claims. (Cl. 46—76)

This invention relates to a wing construction for a model airplane. It is adapted for use in model airplanes of any type, whether powered by rubber bands or utilizing a small gasoline motor or other prime mover for their motive power.

One of the objects of this invention is to provide a model airplane wing which is extremely easy to construct, especially for those without particular mechanical aptitudes. Another object of this invention is to provide a model airplane wing which will under varying uses maintain its original shape without warping or sagging so as to lose its effectiveness. A still further object of this invention is to provide a model airplane wing which provides wing surfaces or airfoil sections which are correctly cambered to allow the model airplane to fly well with whatever motive power is used. A still further object of this invention is to provide a model airplane wing in which it is unnecessary for the model-builder to use particular care in the manner of gluing or otherwise fastening together the respective parts or elements of the wing, and yet be reasonably certain of having a wing properly shaped for model-flying purposes.

Other features and advantages of this invention will be apparent from the drawings in which:

Fig. 3 is a fragmentary view of the underside of a wing element for a model airplane wing showing in greater detail the structure of the inner side and showing ribs in dotted lines.

Fig. 4 is a view taken substantially along line 4—4 in Fig. 3 and shows a cross section of the wing element shown in Fig. 3.

Fig. 5 is a plan view of an assembly of ribs showing one rib severed from the assembly.

Fig. 6 is a side view of one of the severed ribs shown in Fig. 5.

Fig. 7 is an end view of the wing element shown in Fig. 3 with a rib such as shown in Fig. 6 mounted in its proper position relative to the wing element.

Fig. 8 is a fragmentary plan view of a wing element which may be used in the place of ribs and a covering or similar wing structure.

Fig. 9 is a fragmentary plan view of the element shown in Fig. 8 showing the opposite side of said element.

Fig. 10 is a view taken substantially along line 10—10 and showing the wing element of Fig. 4 in dotted lines assembled with the element of Fig. 9.

Fig. 11 is a fragmentary plan view of the inner side of the wing element shown in Fig. 3 having indicated thereupon a line of severance contemplated for use in making a tapered wing.

Fig. 12 is a fragmentary plan view of the inner side of a tapered wing employing the wing element of Fig. 11 and having a wedge-shaped portion inserted therein.

In previous model airplane constructions the wings have been formed by gluing or otherwise fastening together a plurality of longitudinal spars and transverse ribs and covering the whole with a paper or other sheet-like material to form the wing surface or airfoil. The disadvantages of this type of construction have been that the model airplane builder must take extreme care and caution in placing the parts together and making better than average joints between the separate parts. Each part of the wing had to be cut very carefully, for otherwise one improperly cut part would tend to make the wing warp out of the proper shape when assembled, resulting in reducing the wing's effectiveness in flight. Also, great care had to be exercised in stretching and gluing the outer paper on the wing to avoid sagging portions between the ribs and spars which almost invariably happened. A slight warping of the wing would also result in such sagging, thus reducing the effectiveness of the wing. This invention obviates these difficulties by providing a wing having a pre-formed airfoil section which is properly cambered to give the optimum in flying quality and which will retain that camber at all times and under all circumstances of construction and use.

Figure 1:
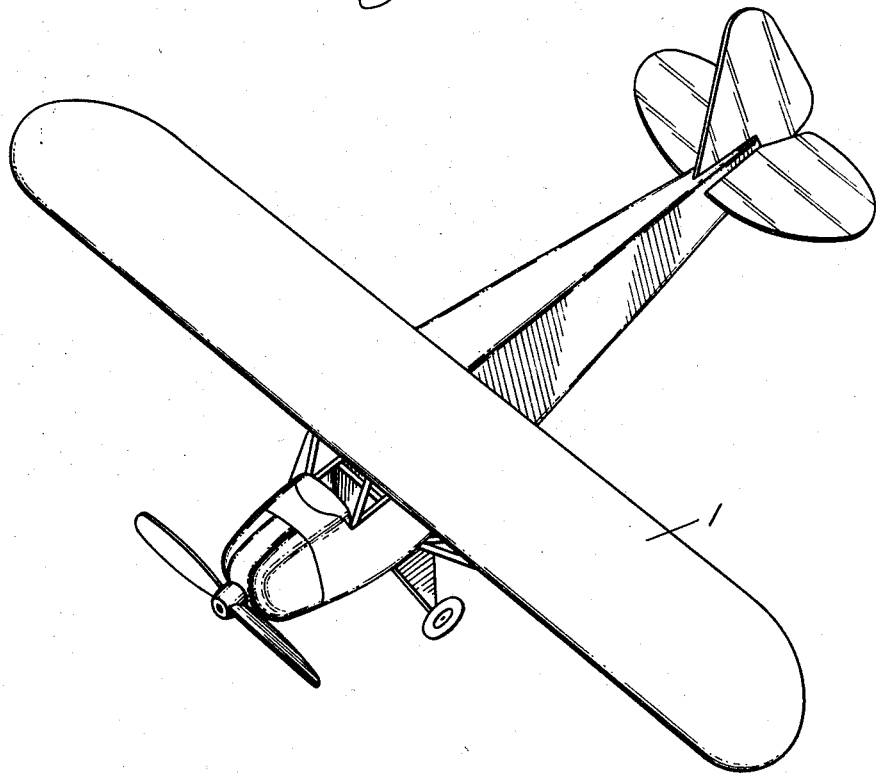
Fig. 1 is a perspective view of a model airplane such as might utilize the wing which is the subject of this invention.
Figure 2:
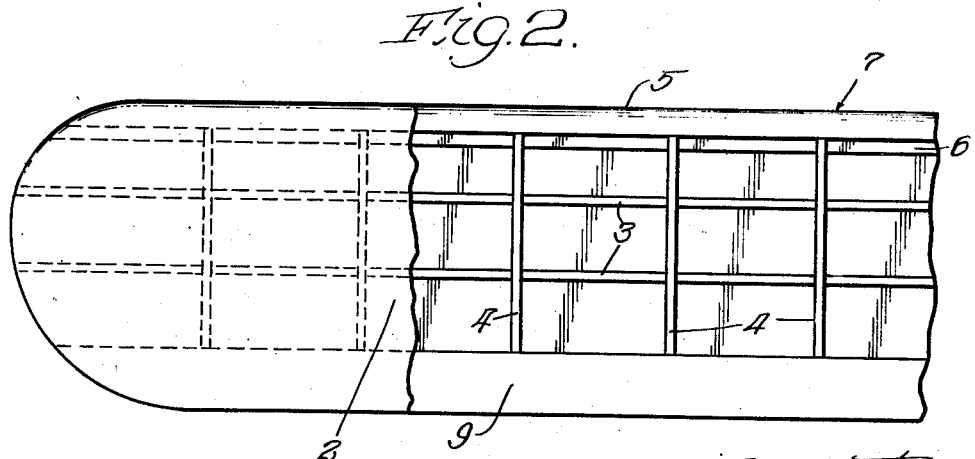
Fig. 2 is a fragmentary view of the underside of the wing shown on the model airplane of Fig. 1 with the covering partly broken away to better show the internal structure of the wing.

Referring more particularly to the drawings, Fig. 1 shows a wing 1 as mounted on a model airplane of the type powered by rubber bands. Fig. 2 shows the underside of the wing 1, shown on the model airplane in Fig. 1. The wing is composed of a wing element 7, a covering 2 partially cut away to show in detail other parts of the wing namely, the spars 3 and the ribs 4 all of which will be described in detail hereinafter. In the wings for smaller models the leading edge 5 of the wings have a shoulder seat 6 in which the ribs 4 are seated as in the wings for larger models, but a similar shouldered seat in the trailing edge 9 may be omitted.

Referring now to Fig. 4, the spars 3 are formed by milling away portions of the wing element 7 leaving a relatively thin portion 8 on either side of the spars 3. This construction is used if the wing is made of lightweight wood such as balsa. A mold or form may be used when making the wing element of a synthetic plastic. The outer surface of the thin portion 8 is cambered to form a part of the outer wing surface designated as an airfoil section. The leading edge portion 5 of the wing is rounded to conform to the camber of the airfoil section and is integrally a part of the wing element. On the inner side of the leading edge portion 5 is a shouldered seat 6 adapted to receive the lower part of the wing. The trailing edge portion 9 of the wing element 7 is formed integrally with the relatively thin portion 8 and has a shouldered seat 10 on the inner side. The seats 6 and 10 and the innermost surface of the spars 3 all lie in a common plane as may be readily seen in Fig. 4. The relatively thick leading and trailing edge portions 6 and 9 respectively and the longitudinal spars 3 strengthen the relatively thin portion 8 of the wing element 7 and act to prevent warping of the wing element.

The various parts of the wing structure herein described are usually placed in a model airplane construction kit and the purchaser then performs the necessary steps to construct the model airplane from the kit purchased.

Referring to Fig. 5 the ribs 4 are provided in a construction kit in the assembly 11. These ribs are die-cut from a single piece of material such as balsa wood or plastic and are not entirely severed from each other but are joined at their extreme ends by unsevered portions 12 of the assembly. The inner surfaces of the ribs 13 as shown in Fig. 6, lie in one common plane in the assembly 11 and the outer surface 14 of the ribs is cambered to a proper airfoil section. The outer surface of the ribs may be shaped to any desired camber or may have a flat surface as required or desired for various model airplanes. When the rib 4 is severed from the assembly 11 a small projection 15 remains at either end of the rib as shown in Fig. 6 and may be cut off with a razor or other model builder's knife so that the sides of the rib will be smooth. As shown in Fig. 7 the rib is mounted on the wing element 7 so that one end of the rib abuts in the shouldered seat 6 in the leading edge portion 5 and the other end abuts in the shouldered seat 10 in the trailing edge portion 9 of the wing element. The inner surface 13 of the rib 4 rests against the inner surface of the longitudinal spars 3 and a joining material such as glue is applied at the points where the rib bears against the parts of the wing element 7 as stated above. In placing the ribs in their positions on the wing element 7 the model airplane builder needs to exercise no particular care in making good joints as the wing element 7 will retain its shape under any circumstances, due to the strengthening effect of the relatively heavy leading and trailing edge portions and the longitudinal spars as hereinbefore described. In general the ribs should be placed substantially at right angles to the spars or at least transverse the length of the wing. It is not imperative that the ribs be placed at exactly a right angle to the spars because a variation from this placement will not substantially affect the chamber of the wing surface as formed by a sheet material placed over said ribs. When the ribs are placed in their proper positions upon the wing element 7, an airplane paper or other sheet material, such as a thin sheet of balsa wood, may be placed over the ribs extending from the leading edge to the trailing edge of the wing to form a smooth airfoil section which, taken with the airfoil section of the wing element 7 will complete the wing surface.

Referring now to Figs. 8 and 9, a unitary wing element 16 may be employed in the place of ribs and a covering over the ribs. The wing element 16 is made from one piece of material and has a relatively thin portion 17 which provides on the outer surface a properly cambered pre-formed airfoil section 18. The inner surface of the relatively thin section 17 has projecting therefrom longitudinal spars 19 which will align themselves in abutting relationship to the spars 3 of the wing element 7 when the two wing elements are placed together. Wing element 16 has a relatively heavy portion 20 toward the leading edge of the wing which is seated in the shouldered seat 6 of the wing element 7 and a relatively heavy portion 21 toward the trailing edge of the wing which is seated in the shouldered seat 10 of the wing element 7 when the said elements are placed together to form a wing. When the elements 16 and 7 are placed together, the spars 19 and 3 integrally formed with the respective elements will be in alignment and may be joined together by the use of a suitable joining element such as glue, to strengthen the respective relatively thin portions of the wing elements. When two such wing elements such as 16 and 7 are used together the wing airfoil is completely preformed and will retain its shape due to the unitary construction of the two elements.

The outer end 16a of the wing element 16 has the same peripherial curvature as the outer end 7a of the wing element 7 from the shouldered seat 6 to the shouldered seat 10, so that the outer edges of the elements will register when said elements are placed together. In order to effect a closure of the said elements at the wing tip, the model-builder merely trims off the end portions of the spars 3 and 19 and the relatively heavy leading and trailing edge portions 5, 9, 20 and 21, to allow the respective relatively thin portions 8 and 17 of the elements 7 and 16 to be moved together. When the wing elements 7 and 16 are moulded from plastic material, the closure at the wing tip is preformed so that trimming of the elements is not necessary.

If it is desired to have a tapered wing, the wing element 7 may be severed along the line 25 shown in Fig. 11 and a wedge-shaped piece 26 is then inserted between the severed parts of the wing element and glued or otherwise fastened to the two parts to effect a tapered wing. The outer surface of the wedge-shaped piece 26 should be flush with the adjoining outer surfaces of the severed parts of the elements 7. When a tapered wing is employed the ribs 4 must be of varying lengths so as to fit in the shouldered seats in the leading and trailing edge portions of the wing. A pre-formed lower element similar to the element 16 may be used instead of ribs and a sheet material covering.

As before stated, the wing elements or parts as hereinbefore described are usually provided in a kit from which the purchaser constructs the model airplane. As can be readily understood, the structure of this invention allows the model airplane builder to make a wing properly shaped for optimum flying quality without having to exercise any great amount of skill in the construction.

It is to be understood that the invention herein described is capable of certain modifications. No unnecessary limitations are to be understood herefrom and modifications in the construction and use of this invention may be made without departing from the spirit and scope of the invention as set out in the appended claims.

What I claim and wish to secure by Letters Patent is:

1. A model airplane wing of the character described, including: a unitary element comprising, a relatively thin portion providing a pre-formed cambered airfoil surface, relatively heavy portions at each of the leading and trailing edges of said element and a shoulder on an edge of each of said heavy portions, said shoulders being confronting; a plurality of spaced ribs extending transverse the length of said wing and abutting against said shoulders, the outer surface of said ribs being pre-formed to provide a desired airfoil section when covered with a sheet material; and a sheet material covering said ribs.

2. A model airplane wing of the character described, including: a unitary element comprising a relatively thin portion providing a pre-formed cambered airfoil surface, relatively heavy portions at each of the leading and trailing edges of said element and a shoulder on an edge of each of said heavy portions, said shoulders being confronting; a plurality of spaced ribs extending transverse the length of said wing and abutting against said shoulders; and means mounted on said spaced ribs and extending between the relatively heavy edge portions at the edges of said first-mentioned unitary element and providing the wing surface opposite the cambered surface.

3. A model airplane wing of the character described, consisting of: a unitary element providing a preformed cambered airfoil surface and comprising relatively heavy portions extending the length of said element at each of the leading and trailing edges thereof and a relatively thin portion intermediate said edge portions and extending the length of said element, said heavy edge portions having confronting shoulders; rib means intermediate said heavy edge portions; and a unitary member attached to and extending between the confronting shoulders of said heavy edge portions and engaging said rib means therebetween, this member providing the other wing surface.

ROBERT REDER.

REFERENCES CITED

The following references are of record in the file of this patent:

UNITED STATES PATENTS

| Number | Name | Date |
|---|---|---|
| D. 149,110 | Christmas | Mar. 30, 1948 |
| 519,553 | Rounds | May 8, 1894 |
| 703,453 | Parker | July 1, 1902 |
| 943,653 | Coe | Dec. 21, 1909 |
| 1,804,823 | Blondin | May 12, 1931 |
| 2,195,695 | Daniel | Apr. 2, 1940 |
| 2,230,393 | Thomson | Feb. 4, 1941 |
| 2,305,514 | Chandler | Dec. 15, 1942 |